US005770658A

United States Patent [19]
Baudoul et al.

[11] Patent Number: 5,770,658
[45] Date of Patent: Jun. 23, 1998

[54] ALK(EN)YL AND HYDROXY-SUBSTITUTED AROMATIC ACID MODIFIED EPOXY RESINS

[75] Inventors: Francoise Jacqueline Aline Baudoul; Seetha Maha Lakshmi Coleman-Kammula, both of Louvaine-La-Neuve, Belgium

[73] Assignee: Shell Oil Company, Houston, Tex.

[21] Appl. No.: 664,335

[22] Filed: Jun. 14, 1996

[30] Foreign Application Priority Data

Jun. 15, 1995 [EP] European Pat. Off. .............. 95201607

[51] Int. Cl.$^6$ ............................ C08L 63/00; C08L 63/02; C08L 63/04
[52] U.S. Cl. .......................... 525/423; 525/481; 525/504; 525/506; 525/508; 525/523; 525/526; 525/533
[58] Field of Search ..................................... 525/500, 423, 525/481, 504, 506, 523, 526, 533

[56] References Cited

U.S. PATENT DOCUMENTS

| | | | |
|---|---|---|---|
| 3,789,044 | 1/1974 | Taft et al. .................................. | 260/18 |
| 4,130,549 | 12/1978 | Ueno et al. ................................ | 528/93 |
| 4,264,758 | 4/1981 | Waddill .................................... | 528/100 |
| 4,296,011 | 10/1981 | Sekmakas et al. ...................... | 260/29.3 |
| 5,244,932 | 9/1993 | van der Wal ........................... | 521/137 |

FOREIGN PATENT DOCUMENTS

| | | |
|---|---|---|
| 0354018 | 8/1989 | European Pat. Off. . |
| 3133103 | 4/1983 | Germany . |

OTHER PUBLICATIONS

Abstract of Japan 58180520 (Oct. 22, 1983).
Lee and Neville, Handbook of Epoxy Resins, McGraw–Hill Book Company, New York, New York, pp. 7–15 to 7–26, 1967.

*Primary Examiner*—Robert E. Sellers
*Attorney, Agent, or Firm*—Dennis V. Carmen

[57] ABSTRACT

Modified epoxy resins are obtained by reaction of an epoxy resin with up to one mol equivalent per epoxy group of an alkyl or alkenyl substituted, hydroxy substituted aromatic acid, especially by reaction of a bisphenol A epoxy resin with an alkylated salicylic acid. Also are described a process for the production of such modified resins, curable compositions comprising the modified epoxy resin and products provided with the cured composition, especially in coating applications and civil engineering applications.

21 Claims, No Drawings

ALK(EN)YL AND HYDROXY-SUBSTITUTED AROMATIC ACID MODIFIED EPOXY RESINS

The present invention relates to modified epoxy resins obtainable by reaction of an epoxy resin with an alkyl or alkenyl substituted, hydroxy substituted aromatic acid, to a process for the production of such modified resins, to curable compositions comprising the modified epoxy resin and to products provided with the cured composition, especially in coating applications and civil engineering applications.

To protect metal surfaces of for instance ships, bridges, aircraft's and building structures usually high-performance coatings are used which have to be resistant to the corrosive effects of water, oxygen, solvents and any other corrosive agents which might come into contact with the coated surfaces. Nowadays, coatings, usually ambient temperature coatings, with the required properties can be obtained by using solvent-borne, two-package epoxy coating systems, comprising especially glycidyl ethers of polyphenols, more particularly bisphenol A based glycidyl compounds, which are cured with for instance polyamine, polyamide, polyamidoamine (or polyaminoamides), polyamidoadduct and polyaminoadduct curing agents, as described in for instance The Handbook of Epoxy Resins by H. Lee and K. Neville, McGraw-Hill, New York (1967), Epoxy Resins, Chemistry and Technology, edited by C. A. May, Marcel Dekker (1988) and Chemistry and Technology of Epoxy Resins, edited by B. Ellis, Blackie Academic & Professional (1993), incorporated herein by reference. Additives as pigments, fillers, extenders, surface activators, thickeners, diluents, accelerators etc. may be used.

The above described systems, however, suffer from a number of drawbacks. The use of solvent-borne systems results in the evaporation of organic solvents, which is from an environmental point of view highly undesired. Further, the use of amine curing agents, especially at low temperatures (0°–10° C.) and/or high humidity, often results in the occurrence of undesired effects as blooming and/or haziness, due to reaction with carbon dioxide and the presence of water and/or water vapour. Further, incomplete cure may occur, resulting in tacky films. Another disadvantage of quite a large number of commercially available systems is that the over-coatability is poor. This may be caused by a low curing speed and/or the occurrence of blooming and/or haziness.

It has now been found that modification of epoxy resins with alkyl or alkenyl substituted, hydroxy substituted aromatic acid results in epoxy resins which in combination with suitable curing agents result in coatings having superior properties, while the disadvantages of the above described systems do not occur. No volatile organic solvents need to be used, thus no environmental objections. The modified resins, in combination with a nitrogen based curing agent, e.g. polyamine, polyamide, polyamidoamine and/or polyaminoadduct curing agent, do not show undesired effects as blooming and/or haziness, even not when used at high humidity conditions and/or low temperature. Further, it has appeared that very acceptable cure rates are obtained even at relatively low temperatures (0° to 5° C.), which is quite exceptional. It will be appreciated that this is a major advantage of the modified resins of the present application. When used for coating applications, the layers are overcoatable after 12 to 24 hours. An additional advantage of the new resins is further that no crystallisation occurs, even not when stored for prolonged periods at lower temperatures (below 25° C., especially between 0° to 10° C.), a problem which often occurs with standard epoxy resins and compositions.

The present invention, therefore, relates to modified epoxy resins obtainable by reaction of an epoxy resin with up to one mol equivalent per epoxy group of an alkyl or alkenyl substituted, hydroxy substituted aromatic acid.

Reaction of epoxy compounds with (alkyl)substituted hydroxybenzoic acids are already known from U.S. Pat. No. 3,789,044. However, as described in column 6, lines 37 to 65, the epoxide-containing materials should be reacted with a stoichiometric amount of hydroxybenzoic acid, as otherwise unreacted epoxide rings will be present in the composition formed. In the examples only stoichiometric amounts of both reactants are used. The reaction is carried out at temperatures above 148.9° C. (300° F.), see column 7, line 23. It is in this respect observed that the curing agent used in this reference is an isocyanate, which is a curing agent which reacts with hydroxy groups rather than epoxy groups. In the compositions according to the present invention, usually nitrogen based curing agents as described above are used, i.e. curing agent which will react with epoxy groups.

The substituted aromatic acid to be used in the present invention is suitably a mono-alkyl, mono-hydroxy substituted benzoic or naphtoic acid, more particularly a substituted benzoic acid, especially a mono- or di-alkyl substituted benzoic acid, more especially a monoalkyl substituted salicylic acid, or a mixture of monoalkyl and dialkyl substituted benzoic acid in which the mono-alkyl compound is the main compound. A certain amount of dicarboxylic acid, e.g. up to 25 mol percent, especially up to 15 mol percent, based on corresponding monocarboxylic acids may be present. The alkyl substituent is preferably a straight or branched alkyl group comprising two to thirty-two carbon atoms, especially six to twenty-four, more especially ten to twenty. A more preferred range is 14 to 18 carbon atoms. A very much preferred substituted benzoic acid is a mixture of predominantly monoalkyl substituted salicylic acid obtained by alkylation of phenol with an alpha-olefin, especially an olefin having from 14 to 18 carbon atoms, which olefin suitably may be obtained by oligomerisation of ethylene, followed by carboxylation of the alkylated phenol. Suitable processes to prepare such alkylated salicylic acids are described in for instance UK 586461, UK 1146925 and EP 370555. The amount of mono-alkyl salicylic acid is usually between 60 and 90 percent, mostly straight chain alkyl groups substituted at the one or three-alkyl position at the ortho position of the hydroxy group of the aromatic ring.

The amount of substituted aromatic acid is suitably up to 60 mol percent per epoxy group, preferably between 10 and 40 mol percent, more preferably about 20 mol percent.

The epoxy resins used as starting material in the present invention generally have an average of more than one, suitably at least 1.5, preferably at least 1.7, reactive 1,2-epoxy groups per molecule. These epoxy compounds generally have an average of up to 6, preferably up to 4, more preferably up to 2.5, reactive 1,2-epoxy groups per molecule. These epoxy compounds can be monomeric or polymeric, saturated or unsaturated, aliphatic, cycloaliphatic, aromatic or heteroaromatic and may be substituted, if desired, with other substituents in addition to the epoxy groups, e.g. hydroxyl groups, alkoxyl groups or halogen atoms, especially bromine atoms. Further, reactive diluents, especially mono-epoxy compounds may be added to the reaction mixture, especially to lower the viscosity.

Suitable epoxy compounds are the reaction products of polyphenols and epihalohydrins, polyalcohols and epihalohydrins, amines and epihalohydrins, sulphur containing compounds and epihalohydrins, polycarboxylic acids and epihalohydrins or mixtures thereof.

Preferred epoxy compounds are the reaction products of polyphenols and epihalohydrins, of polyalcohols and epihalohydrins, polycarboxylic acids and epihalohydrins or mixtures thereof, the reaction products of polyphenols and epihalohydrins especially preferred. Illustrative examples of epoxy compounds are described in for instance The Handbook of Epoxy Resins by H. Lee and K. Neville, McGraw-Hill, New York (1967), Epoxy Resins, Chemistry and Technology, edited by C. A. May, Marcel Dekker (1988) and Chemistry and Technology of Epoxy Resins, edited by B. Ellis, Blackie Academic & Professional (1993).

Epoxy compounds of particular interest in the practice of the present invention include diglycidyl ethers of bisphenol compounds, particularly those compounds represented by general formula I,

wherein each A independently is a divalent hydrocarbon group having 1 to 8 carbon atoms, preferably methylene or isopropylidene, —C(O)—, —O—, —S—, —S—S—, —S(O)—, —S(O)$_2$— or a covalent bond, each X independently is hydrogen, an alkyl group having 1 to 4 carbon atoms, preferably methyl, or halogen, preferably chlorine or bromine, and n has an average value of 0 to 12, preferably 0 to 2. More preferably A is isopropylene, X is hydrogen or bromine, especially hydrogen, and n is up to 0.2.

The average epoxy equivalent weight is from 140, preferably from 170, up to about 3000, preferably up to 950, more preferably up to about 450.

Especially preferred examples of the epoxy compounds are bisphenol A and bisphenol F, especially bisphenol A, type epoxy compounds having an average epoxy equivalent weight of from 160 to 200. They are commercially available from Shell Chemicals Europe under the trade names EPIKOTE 828, 862 and 806. Further especially preferred examples are brominated bisphenol A compounds which for example have an epoxy equivalent of from 200 to 800.

Further useful epoxy compounds are epoxy novolac resins. The epoxy novolac resins can be obtained by reacting, preferably in the presence of a basic catalyst, e.g. sodium or potassium hydroxide, an epihalohydrin, e.g. epichlorohydrin, with the resinous condensate of an aldehyde, e.g. formaldehyde, and either a monohydric phenol, e.g. phenol itself, or a polyhydric phenol. Further details concerning the nature and preparation of these epoxy novolacs resins can be obtained in the three general references mentioned above. A suitable phenol-formaldehyde epoxy novolac resin is EPIKOTE 155 available from Shell Chemicals Europe.

The above-mentioned epoxy compounds can be obtained by means known for the preparation of epoxy resins from a compound containing hydroxyl groups by reacting such compounds with an epihalohydrin in the presence of a suitable catalyst and reacting the resultant intermediate halohydrin ether with a basic acting substance such as an alkali metal hydroxide. It has to be observed that many of the usual epoxy compounds to be used for the production of the modified resins of this invention will be commercially available.

The modified resins of the present invention may be prepared by reaction of an epoxy resin with an alkyl or alkenyl substituted hydroxy substituted aromatic acid. The reaction is suitably carried out between 100° and 200° C., preferably between 140° and 180° C., for a time sufficient to complete the desired reaction, which is suitably from 0.25 to 8 hours, more suitably from 0.5 to 6 hours, preferably between 2 and 4 hours. At the lower temperatures longer reaction times are required whereas at the higher temperatures less reaction time is required to complete the reaction. At temperatures above 200° C. and at the longer reaction times undesired reactions may occur, while at temperatures below 100° C. the reaction times become very long, which may be inconvenient. The reaction can be conducted at any suitable pressure from subatmospheric to superatmospheric, e.g. from 0.1 to 10 bar. Atmospheric pressure is preferred. The reaction is preferably carried out until essentially all alkyl substituted, hydroxy substituted aromatic acid as initially present in the reaction mixture have reacted. Essentially all substituted benzoic acid has reacted when no free acid can any more be detected in the reaction mixture. In that case at least 90, usually at least 95 mol percent of the acid has reacted. The reaction may be carried out by addition of the epoxy compound to the aromatic acid, by addition of the aromatic acid to the epoxy compound, by mixing the two reactants followed by reacting or combinations thereof.

The reaction may be carried out with or without solvent. Solvent may be used especially when the reaction is carried out at a relatively low temperature. In the case a solvent is used aromatic solvents and/or ketones can be used. The reaction can be carried out in the presence of a suitable catalyst for conducting the reaction between an epoxy group and a carboxylic acid group. In practice usually a catalyst is used. For general information about solvents and catalysts reference is made to three references discussed above. Suitable such catalysts are acid and base catalysts, for instance Lewis acid catalysts and metal salt catalysts, more specifically tertiary amines, quaternary ammonium and phosphonium compounds and metal salts, especially of organic acids. Suitable tertiary amine catalysts include, for example, triethylamine, tributylamine, benzyldimethylamine, tris(dimethylaminomethyl)phenol, dimethylethanolamine, n-methylmorpholine, and combinations thereof. Suitable quaternary ammonium compounds are benzyl trimethyl ammonium chloride, Suitable phosphonium compounds include, for example, ethyl triphenyl phosphonium salts, tetrabutyl phosphonium salts and combinations thereof. Suitable metal salts of organic acids are for example stannous salts of carboxylic acids as octanoic acid. The amount of catalyst to be employed is that amount which will effectively catalyse the reaction between the epoxy resin and the monocarboxylic acid. The specific amount of catalyst will depend upon the particular reactants and the catalyst being employed. Generally the catalyst is employed in amounts between 0.1 to 100 ppm weight, especially between 1 and 10 ppm, based on epoxy resin.

The modified epoxy resins of the present invention can be cured with any suitable cross-linking agent such as a polyamine, polyamide, polyamidoamine and polyaminoadduct, a polycarboxylic acid or anhydride thereof or a polyphenolic compound. In this respect also reference is made to the three general references mentioned above. Suitable examples include primary and secondary polyamines, carboxylic acids and anhydrides thereof, phenolic hydroxyl-containing compounds, guanidine's, biguanidine's, polyamides, Mannich bases, ketimines, oxazolines and combinations thereof. The polyaminoadduct embraces the reaction of an aliphatic primary polyamine with one of the following reactants: alkyl monoepoxides, diepoxides, ethylene oxide, propylene oxide, acrylonitrile, aldehydes (thereby forming Schiff's bases), ketones, or metallic salts of organic or inorganic acids. Particularly suitable curing agents include, for example, ethylene diamine, diethylenetriamine, triethylenetetramine, dicyandiamide, diaminocyclohexane, adipic acid, phosphoric acid or combinations thereof. Many of the suitable curing agents are commercially available. The curing agents are employed in an amount which will effectively cure the composition containing the modified epoxy resin. These amounts will depend upon the particular epoxy resin and the curing agent employed. Suitable amounts are from 0.4 to 1.2, suitably from 0.6 to 1.1, more suitably from 0.8 to 1.0, most suitably about 1 equivalent of curing agent per epoxide equivalent for those curing agents which cure by reacting with the epoxy group of the epoxy resin. The Handbook of Epoxy Resins and the other two references mentioned above contain various discussions concerning the curing of epoxy resins as well as a compilation of suitable curing agents.

If desired, the thermosettable compositions of the present invention can be blended with other materials such as solvents or (reactive) diluents, fillers, pigments, dyes, flow modifiers, thickeners, anti-foamers reinforcing agents, fire retarding or suppressing agents and combinations thereof. These additives are added in functionally equivalent amounts, e.g. the pigments and/or dyes are added in quantities which will provide the composition with the desired colour. Suitably the amount of additives is from 0 to 150 percent by weight, especially 20 to 100 percent, based upon the combined weight of the epoxy resin and the curing agent. Solvents and diluents which can be employed herein include, for example, hydrocarbons, ketones, glycol ethers, glycolether acetates and combinations thereof. A solvent, e.g. an aromatic solvent, especially xylene, or a diluent may be used to modify the viscosity. Each of the modifiers such as thickeners, flow modifiers and the like can be employed suitably in amounts of from 0.05 to 5, especially 0.1 to 3 percent by weight based upon the combined weight of epoxy resin and curing agent. Reinforcing materials which can be employed herein include natural and synthetic fibres in the form of woven, mat, monofilament, chopped fibres and the like, Suitable reinforcing materials include glass, ceramics, nylon, rayon, cotton, aramid, graphite and combinations thereof. Suitable fillers which can be employed include, for instance, inorganic oxides, inorganic carbonates, ceramic microspheres, plastic microspheres, glass microspheres, clay, sand. gravel and combinations thereof. The fillers can be used in amounts suitably from 0 to 100, especially 10 to 60 percent by weight based upon the combined weight of epoxy resin and curing agent.

The modified epoxy resins of the present invention can be formulated for use in such applications as, for instance, coating, flooring, casting, crack repair, moulding, adhesives, potting, filament winding, encapsulation, structural and electrical laminates, composites and the like.

The modified epoxy resins are especially suitable for use in coating applications. In that case the starting epoxy resin is especially a liquid resin, a semi solid epoxy resin or epoxy resin solution, especially a bisphenol A based resin, while the curing agent is a polyamine, polyamide, polyaminoamide or amineadduct. These coating compositions can be used at relatively low temperatures, e.g. from −25° C. to 25° C., especially from −5° to 20° C., at relatively high humidity, e.g. from 50 to 95 percent r.h., especially from 60 to 90 percent r.h. Coating applied at lower temperature show excellent properties with respect to the complete absence of blooming and/or haziness, and are overcoatable after 6 to 24 hours, usually already after 8 to 12 hours. The coating compositions can be applied by conventional coating methods such as brush-coating and spray coating. Curing can generally be carried out by exposure of the applied composition to ambient conditions for one hour to one week.

Coating compositions according to the invention may be provided as a two-container system. The first container contains the modified epoxy resin component and the second container contains the curing agent for the epoxy resin. Any diluents used may be incorporated into either container, although any amine reactive diluents are preferably provided with the resin component.

The following examples illustrate the present invention. Unless otherwise mentioned, all parts and percentages are weight parts and weight percentages.

EXAMPLE 1

EPIKOTE 828, a bisphenol A based epoxy resin available from Shell Chemicals Europe, 500 g, a mixture of 3-alkyl substituted salicylic acids in which the alkyl group contained from 14 to 18 carbon atoms, 327 g (20 mol percent per epoxy group), and ethyltriphenylphosphonium iodide, 0.15 g, were mixed together. The reaction temperature was increased to 175° C. (heating up to 110° C. in 30 minutes, 30 minutes at 110° C., heating to 175° C. in 60 minutes, 30 minutes at 175° C., total reaction time 2.5 hours). After cooling the modified resin was obtained.

EXAMPLES 2–4

Example 1 was repeated, but different final reaction temperatures were used to prepare modified resins. The reaction times were kept the same. EPIKOTE 828EL, a commercially available resin, was used as starting resin. It will be clear that due to the lower viscosity of the products, these products now can be used in certain applications without solvent or with less solvent.

| Example | Temperature | Final EGC (mmol/kg) | Viscosity (Pa.s) |
|---|---|---|---|
| 2 | 175 | 2288 | 2.76 |
| 3 | 140 | 2385 | 2.42 |
| 4 | 110 | 2488 | 2.08 |

EXAMPLE 5

Example 1 was repeated, however instead in ethyltriphenylphosphonium iodide, tin octoate was used. A modified resin having a final EGC value of 2022 was obtained instead of 2288.

EXAMPLE 6

Example 1 was repeated, however, using EPIKOTE 834-X-80 (high viscosity liquid epoxy resin produced from bisphenol A and epichlorohydrin; EGC 4000; 80% m/m solution in xylene; 200 g) instead of EPIKOTE 828. The final reaction temperature was 160° C. The modified resin had a final EGC of 1763 mmol/kg and a viscosity of 4.23 Pa.s (measured at a Brookfield viscometer at 23° C./50% r.h.).

EXAMPLES 7–13

Clear lacquers were made using EPIKOTE 828EL, the modified resins made in Examples 2–6 and a physical mixture of Epikote 828EL and the alkylated salicylic acid as used in Examples 1–6 to prepare the modified resins. In each of the examples 50 g of resin, ANCAMIDE 2050, a commercially available curing agent and 5 g of ANCAMINE K54 (2,4,6-tris(dimethylaminomethyl)phenol, a commercially available curing accelerator, were used. The Beck Koller gel times (hours) were measured at 5° C./85% r.h. (softgel time/hard gel time). In Example 13 a blend of 50 g resin and 32.6 g of alkyl salicylic acid was used.

| Ex. | Resin | Curing agent | Gel times | Appearance |
|---|---|---|---|---|
| 7 | E 828EL | 40.05 g | 5.2/12.4 | hazy, tacky |
| 8 | Example 2 | 17.16 g | 3.2/6.7 | clear, non-tacky |
| 9 | Example 3 | 17.89 g | 3.5/6.7 | clear, non-tacky |
| 10 | Example 4 | 18.66 g | 4.1/7.6 | clear, non-tacky |
| 11 | Example 5 | 15.5 g | 1.7/4.8 | clear, non-tacky |
| 12 | Example 6 | 13.2 g | 1.8/4.3 | clear |
| 13 | E 828EL/acid | 40.05 g | 8.2/19.5 | hazy, tacky |

EXAMPLES 14 and 15

Example 7 was repeated, however, using EPIKURE F205, a commercially available curing agent, as curing agent instead of Ancamide 2050. The amount of resin was 30 g. Ancamine K54, 3 g, was used as curing accelerator.

| Example | Resin | Curing agent | Gel times |
|---|---|---|---|
| 14 | E 828EL | 16.90 g | 5.7/11.3 |
| 15 | Example 2 | 7.21 | 3.0/5.9 |

EXAMPLES 16–18

Examples 1–3 were repeated, however, using 82 g (5 mol percent per epoxy group) of 3-alkyl substituted salicylic acid.

| Example | Temperature | Final EGC (mmol/kg) | Viscosity (Pa.s) |
|---|---|---|---|
| 16 | 175 | 4247 | 8.07 |
| 17 | 140 | 4298 | 8.65 |
| 18 | 110 | 4290 | 6.74 |

EXAMPLE 19

Example 1 was repeated, however, using EPIKOTE 155 (a glycidated phenol-formaldehyde novolac; 345 g) instead of EPIKOTE 828. The final reaction temperature was 175° C. The modified resin had a final EGC of 2374 mmol/kg.

EXAMPLES 20–23

In the same way as described for examples 7–13, lacquer layers were prepared using the modified resins prepared in the examples 16–19.

| Ex. | Resin | Curing Agent | Gel times | Appearance |
|---|---|---|---|---|
| 20 | Example 16 | 31.85 g | 4.1/10.7 | clear, almost non-tacky |
| 21 | Example 17 | 31.85 g | 4.1/10.5 | clear, slightly tacky |
| 22 | Example 18 | 31.85 g | 4.0/10.6 | clear, slightly tacky |
| 23 | Example 19 | 16.50 g | 1.1/2.1 | clear, non-tacky |
| 24 | EPIKOTE 155 | 33.96 g | 1.9/3.9 | hazy, tacky |

EPIKOTE, EPIKURE, ANCAMIDE and ANCAMINE are trademarks. EPIKOTE 828 is a medium viscosity bisphenol A based epoxy resin having the structure of general formula I in which X is hydrogen and n is 0.1. It contains no diluent. EPIKOTE 828EL is identical with EPIKOTE 828, but having a low hydrolysable chlorine content. EPIKOTE 834-X-80 is a high viscosity resin of general structure I in which X is hydrogen and n is between 0.1 and 0.2, 80% m/m solution in xylene. EPIKOTE 155 is a solid, glycidated phenol-formaldehyde novolac resin having an EGC of 5650 mmol/kg. ANCAMIDE is a commercially available (Air Products) polyamide curing agent. ANCAMINE is a commercially available (Air Products) amine based cure accelerator containing 2,4,6-tri(methyldimethylamino)phenol. EPIKURE F205 is a curing agent based on EPIKOTE 828 and isophoronediamine. Examples 7, 13, 14 and 24 are comparison examples, not using the modified resins according to the present invention.

We claim:

1. A curable coating composition comprising a modified epoxy resin and a curing agent, said modified epoxy resin comprising the reaction product of an epoxy resin with less than one mol equivalent per epoxy group of an alkyl or alkenyl substituted, hydroxy substituted aromatic acid; said curing agent comprising a primary or secondary polyamine, a polyamide, a polyamidoamine, a polyaminoadduct, a polycarboxylic acid or anhydride thereof, or a polyphenolic compound.

2. The curable coating composition of claim 1, wherein the alkyl or alkenyl substituted. hydroxy substituted aromatic acid comprises a monoalkyl or dialkyl-substituted benzoic acid.

3. The curable coating composition of claim 2, wherein the acid comprises an alkyl substituted salicylic acid, wherein the alkyl substituent comprises a straight or branched alkyl group comprising six to twenty-four carbon atoms.

4. The curable coating composition of claim 1 in which the molar amount of substituted aromatic acid is between about 10 to about 40 percent.

5. The curable coating composition of claim 1 in which the epoxy resin is a diglycidyl ether of a bisphenolic compound represented by the general formula I:

in which A is a divalent hydrocarbon group having 1 to 8 carbon atoms, —C(O)—, —O—, —S—, —S—S—, —S(O)—, —S(O)$_2$— or a covalent bond, each X independently is hydrogen, an alkyl group having 1 to 4 carbon atoms, chlorine or bromine, and n has an average value of 0 to 12.

6. The curable coating composition of claim 1 in which the epoxy resin comprises an epoxy novolac resin.

7. A process for the preparation of a curable coating composition comprising the reaction product of a modified epoxy resin and a curing agent, said modified epoxy resin comprising the reaction product of an epoxy resin with less than 1 mol equivalent per epoxy group of an alkyl or alkenyl substituted, hydroxy substituted aromatic acid; said curing agent comprising a primary or secondary polyamine, a polyamide, a polyamidoamine, a polyaminoadduct, a polycarboxylic acid or anhydride thereof, or a polyphenolic compound.

8. A process according to claim 7, in which the modified epoxy resin reaction is carried out at a temperature between 100° and 200° C. until essentially all hydroxy substituted aromatic acid as initially present in the reaction mixture have reacted and in which as a catalyst is used a tertiary amine, a quaternary ammonium or phosphonium compound or a metal salt.

9. A metal surface product coated with the curable coating composition according to claim 1.

10. An curable coating composition of claim 1, comprising the reaction product of an epoxy resin with up to 60 mol percent per epoxy group of said acid.

11. The curable coating composition of claim 10, wherein said acid comprises a mono-alkyl, mono-hydroxy aromatic acid.

12. Curable coating composition of claim 11, comprising 15 mol percent or less of dicarboxylic acids, based on the presence of monocarboxylic acids.

13. The curable coating composition of claim 11, wherein said alkyl is a straight or branched alkyl group containing 10 to 20 carbon atoms.

14. The curable coating composition of claim 13, wherein said acid comprises a monoalkyl-substituted salicylic acid.

15. The curable coating composition of claim 14, wherein said epoxy resin comprises diglycidyl ethers of bisphenol compounds.

16. The curable coating composition of claim 5, wherein A is methylene or isopropylene, X is hydrogen or bromine, and n has an average value from 0 to 2.

17. The curable coating composition of claim 1, wherein said curing agent comprises a primary or secondary polyamine, a polyamide, a polyamidoamine, or a polyaminoadduct.

18. A curable coating composition of claim 17, wherein the amount of curing agents is about from 0.8 to 1.0 equivalents of curing agents per epoxide equivalent.

19. The process of claim 7, wherein the curing agent comprises a primary or secondary polyamine, a polyamide, a polyamidoamine, or a polyaminoadduct.

20. The process of claim 19, wherein the amount of curing agent ranges from 0.8 to 1.0 equivalents of curing agent per epoxide equivalent.

21. The process of claim 7 wherein the curing agent comprises ethylene diamine, diethylene triamine, triethylene tetramine, a dicyandiamide, diaminocyclohexane, or mixtures thereof.

* * * * *